(12) United States Patent
Ramamurthy

(10) Patent No.: US 8,543,688 B1
(45) Date of Patent: Sep. 24, 2013

(54) GENERATING CORRELATION CODES FOR LOCATION INFORMATION

(75) Inventor: Suryanarayanan Ramamurthy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 381 days.

(21) Appl. No.: 12/963,296

(22) Filed: Dec. 8, 2010

(51) Int. Cl.
  *G06F 15/16* (2006.01)
  *G06F 15/173* (2006.01)
  *H04M 1/66* (2006.01)

(52) U.S. Cl.
  USPC ............................ 709/224; 709/203; 455/410

(58) Field of Classification Search
  USPC ................................................ 709/203, 224
  See application file for complete search history.

(56) References Cited

U.S. PATENT DOCUMENTS

| | | | |
|---|---|---|---|
| 5,365,451 A | 11/1994 | Wang et al. | |
| 6,249,245 B1 | 6/2001 | Watters et al. | |
| 6,313,787 B1 | 11/2001 | King et al. | |
| 6,570,529 B2 | 5/2003 | Richton et al. | |
| RE38,267 E | 10/2003 | Borkowski et al. | |
| 6,839,022 B1 | 1/2005 | Benco et al. | |
| 6,970,871 B1 | 11/2005 | Rayburn | |
| 7,069,319 B2 | 6/2006 | Zellner et al. | |
| 7,149,504 B1 | 12/2006 | Weaver et al. | |
| 7,505,765 B2 | 3/2009 | Frangione et al. | |
| 7,689,200 B1 | 3/2010 | Zeller | |
| 2004/0205198 A1 | 10/2004 | Zellner et al. | |
| 2006/0195570 A1 | 8/2006 | Zellner et al. | |
| 2007/0071238 A1* | 3/2007 | Adams et al. | 380/46 |
| 2007/0218872 A1 | 9/2007 | Pfleging et al. | |
| 2009/0093233 A1 | 4/2009 | Chitlur | |

* cited by examiner

*Primary Examiner* — Wing F Chan
*Assistant Examiner* — David X Yi

(57) ABSTRACT

A location data system in a wireless communication system generates and maintains a random number without transferring the random number from the location data system. The location data system monitors a message flow to identify location messages that include a wireless communication device identifier and location information for the wireless communication device. The location data system then processes the random number and the device identifier to generate a correlation code. The location data system transfers location records, including the correlation code and the location information but not the device identifier, from the location data system, wherein individual location records are transferred in response to identifying individual location messages. Finally, the random number is deleted from the location data system.

16 Claims, 5 Drawing Sheets

GENERATING CORRELATION CODES FOR LOCATION INFORMATION

TECHNICAL BACKGROUND

The location of a wireless communication device may be determined for a variety of reasons. These reasons include providing emergency response services, supporting location based services, providing data to applications running on the wireless communication device, or for other reasons. There are many different methods for determining the location of a wireless communication device. Some of these methods make use of a location assistance system which is outside the wireless communication system. When requested to do so, the location assistance system determines the location of the wireless communication device through various means and transmits messages to the wireless communication system. The messages include information about the location of the wireless communication device.

Although the primary purpose for determining the location of the wireless communication device is to serve the needs of the wireless communication device and the wireless communication system, the resulting location information may also be useful for other purposes. The combined location information of many wireless communication devices may be used to monitor traffic conditions, track the movement of groups of people, aid law enforcement, or for other purposes. In order to serve these alternative purposes, the operator of the wireless communication system may need to provide wireless communication device location information to other parties or systems which are outside the wireless communication system.

Overview

A location data system in a wireless communication system generates and maintains a random number without transferring the random number from the location data system. The location data system monitors a message flow to identify location messages that include a wireless communication device identifier and location information for the wireless communication device. The location data system then processes the random number and the device identifier to generate a correlation code. The location data system transfers location records, including the correlation code and the location information but not the device identifier, from the location data system, wherein individual location records are transferred in response to identifying individual location messages. Finally, the random number is deleted from the location data system.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
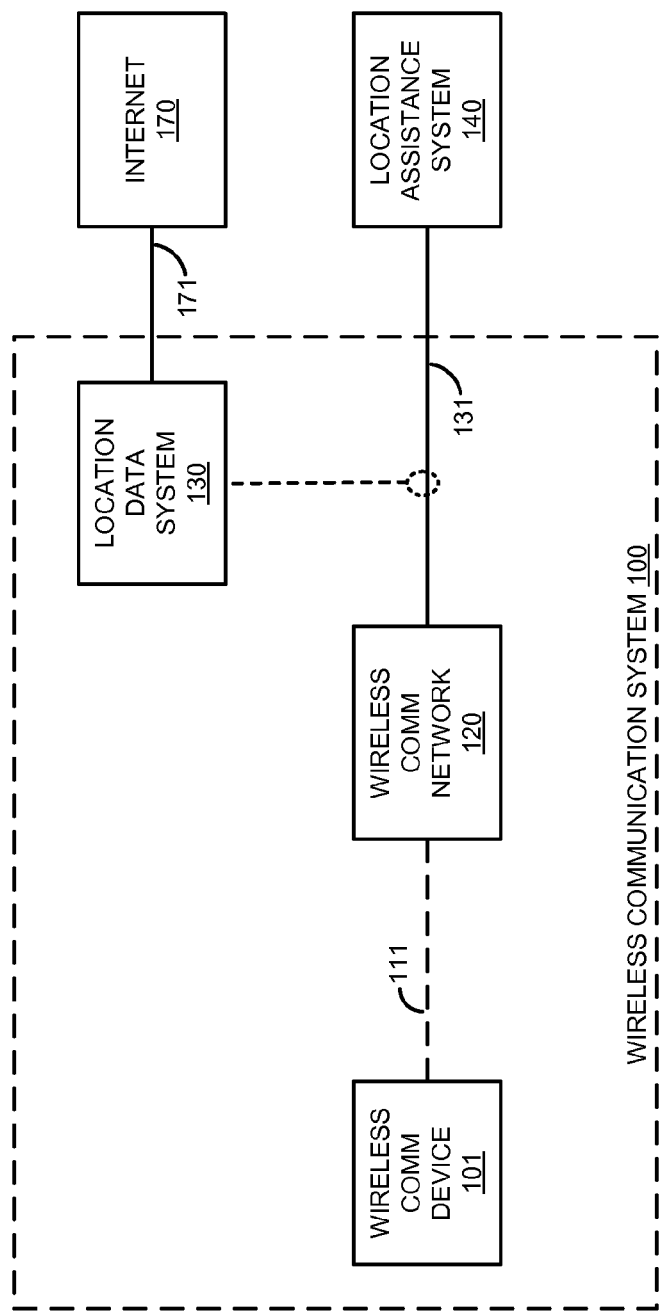
FIG. 1 illustrates a wireless communication system.

FIG. 1 illustrates wireless communication system 100. Wireless communication system 100 includes wireless communication device 101, wireless communication network 120, location data system 130, location assistance system 140, and Internet 170. Wireless communication device 101 and wireless communication network 120 are in communication over wireless communication link 111. Wireless communication network 120 and location assistance system 140 communicate over communication link 131. Location data system 130 monitors the message traffic on link 131. Location data system 130 and Internet 170 communicate over link 171.

In a variation of FIG. 1, wireless communication network may not be directly linked to location assistance system 140. In this configuration, wireless communication network 120 may use internet 170 to communicate with location assistance system 140.

Figure 2:
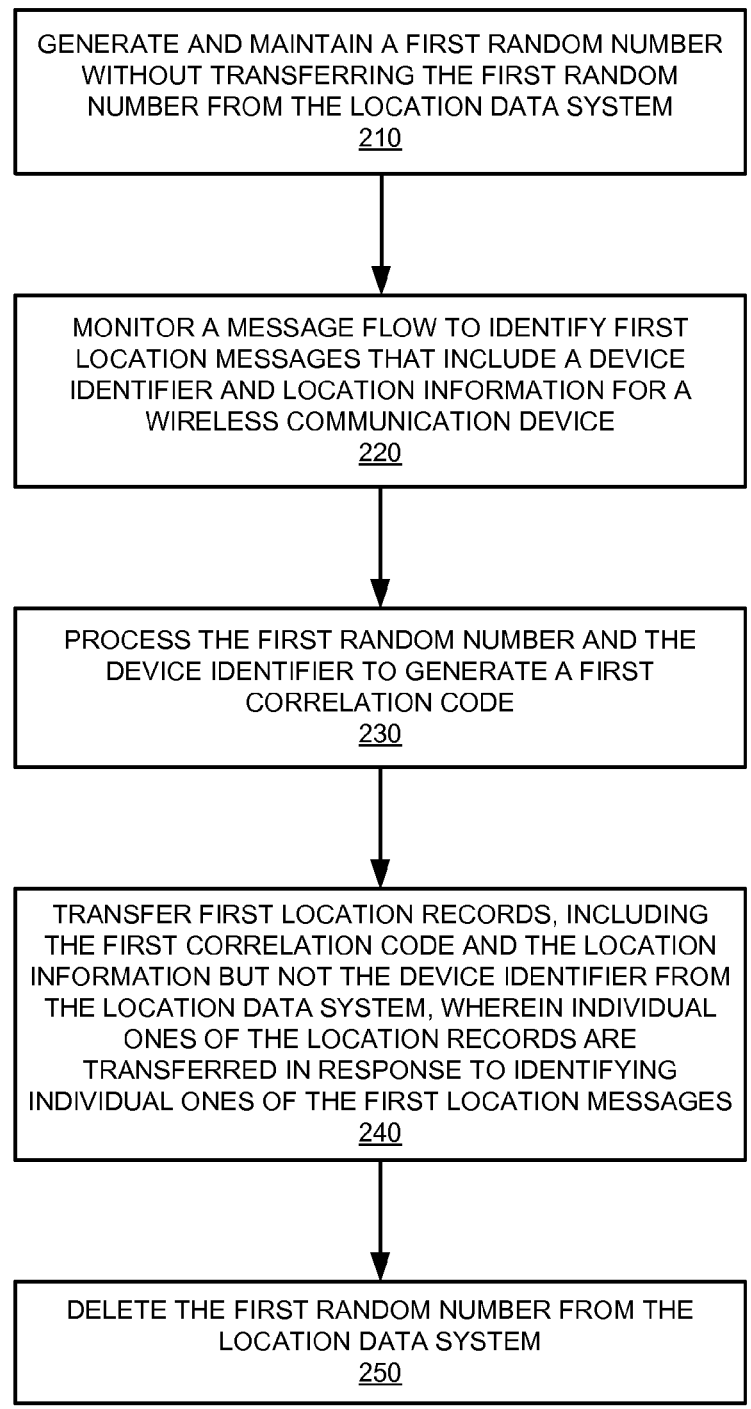
FIG. 2 illustrates an operation of a wireless communication system.

FIG. 2 illustrates an operation of wireless communication system 100. The steps of the operation are indicated below parenthetically. Location data system 130 generates and maintains a first random number without transferring the first random number from location data system 130 (210). Location data system 130 monitors message flow between wireless communication network 120 and location assistance system 140 on link 131 to identify first location messages that include a device identifier and location information for wireless communication device 101 (220). Location data system 130 processes the first random number and the device identifier to generate a first correlation code (230). Location data system 130 then transfers location records, including the first correlation code and the location information but not the device identifier, from location data system 130 to Internet 170 (240). The individual location records are transferred in response to identifying individual location messages. Location data system 130 then deletes the random number (250).

Referring back to FIG. 1, wireless communication device 101 could comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus, including combinations thereof. Wireless network protocols that may be utilized by wireless communication device 101 include Code Division Multiple Access 1xRTT (CDMA), Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless communication network 120.

Wireless communication network 120 comprises the core network of a wireless communication provider, and could include RF communication circuitry, antennas, routers, gateways, telecommunication switches, servers, computer systems, processing systems, or other communication equipment and systems for providing communication and data services, including combinations thereof. Wireless communication network 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems, including combinations thereof.

Wireless communication network 120 may be configured to communicate over metallic, wireless, or optical links. Wireless communication network 120 may be configured to use time-division multiplexing (TDM), Internet Protocol (IP), Ethernet, optical networking, wireless protocols, communication signaling, or some other communication format, including combinations thereof. In some examples, wireless communication network 120 includes further access nodes and associated equipment for providing communication services to additional wireless communication devices across a large geographic region.

Location data system 130 comprises a processing system and a network communication interface. Location data system 130 may also include other components such as a memory system, computing components, software, circuitry, router, power supply, and structural components. Location data system 130 may reside in a single device or may be distributed across multiple devices. Location data system 130 may be a discrete system or may be integrated within other systems, including other systems within wireless communication network 120 or wireless communication system 100. In some examples, location data system 130 could be implemented in the form of a server, data processing system, or some type of computing platform, including combinations thereof.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Bluetooth, Internet, telephony, or some other communication format, including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions, including combinations thereof.

Communication links 131 and 171 use metal, air, space, optical fiber such as glass or plastic, or some other material as the transport medium, including combinations thereof. Communication 131 and 171 could use various communication protocols, such as TDM, IP, Ethernet, telephony, optical networking, hybrid fiber coax (HFC), communication signaling, wireless protocols, or some other communication format, including combinations thereof. Communication links 131 and 171 may be direct links or could include intermediate networks, systems, or devices.

A wireless communication system may use multiple different methods to determine the location of a wireless communication device. Some of these methods involve sending location request messages to external devices or systems and receiving location messages with location information from these devices or systems. Although the wireless communication device and the wireless communication system are the primary intended recipients and users of the location messages, the location information contained in these messages may be useful for other purposes as well. The combined location information of many wireless communication device users can be used to monitor traffic patterns, analyze the movement of groups of people, make marketing decisions, aid law enforcement, or be used for other purposes.

In these alternative uses of location information, the group behaviors and group statistics are of interest but the identity of individual wireless communication devices or users may not be. For example, simultaneously tracking the movement of many users in a given area may provide useful traffic flow information even though the specific identities of those devices or users are not known. Obtaining the location information and identifying the location and movement trends in real time, or near real time, may be of further benefit.

These alternative uses of the location information may be unrelated to a request from the device user, may not benefit the devices user, and may use the information in a manner for which the user has not granted permission. In this context, wireless communication device users may have privacy concerns regarding their location information, how it might be used, and what other parties it might be provided to. The operator of a wireless communication system may wish to explore other uses or business opportunities associated with the location information of its users but may need to implement these other uses in a manner which does not violate the users' privacy or rights.

Privacy concerns regarding alternative uses of location information by information users could be addressed in several ways. First, all unique identifying information could be removed from the location records before they are provided to information users to be used for other purposes. Using this approach, an information user would receive records indicating that a wireless communication device was at a particular location but would have no information identifying the wireless communication device or the device user, either directly or indirectly.

While this approach will protect the privacy and proprietary information of the device user, it also significantly reduces the usefulness of the location information because movement trends associated with individual devices cannot be monitored. The information user cannot identify or track movement trends because each record of location information received cannot be linked with any previously received location information to understand how particular wireless communication devices have moved during the intervening time period. In other words, using this approach, the information user receives location information snapshots which indicate the location of one or more wireless communication devices at a particular time but probably does not have an effective way of relating those snapshots to each other in order to understand movement of the wireless communication devices.

In an alternate approach, the device identification information is replaced with a unique, encoded device identifier. The encoded device identifier is attached to the location information in place of the device identification information before the location information is provided to the information user. The location information record is modified by converting or encoding the original device identifier using an algorithm which is not known outside of the wireless communication system. The unique device identifier allows the information user to relate or associate received location information with previously received location information. In this way, the information user can link location information which is associated with the same wireless communication device at different points in time in order to establish movement patterns or trends.

The approach described above may resolve some, but not all, of the privacy concerns of device users. First, there may be a concern that the algorithm for encoding the device identifiers may eventually be leaked, discovered, or hacked. This would allow the information user or anyone in possession of the location information to discover the actual identity of the devices or users associated with the location information. Second, there may be a concern that a party in possession of large amounts of location information may be able to indirectly identify or infer the identity of the device or user even though the device identifiers have been encoded.

For example, if the location information associated with one unique device identifier frequently indicates presence at some work location during work hours and that same device identifier frequently indicates presence at some residence during nighttime hours, the location information user could infer a relationship between a person who works at the work location and lives at the residence and the device identifier. In this way, the user's privacy may be violated even though the algorithm used to convert the device identification information to the unique identifier was not directly revealed or discovered.

For these reasons, it is desirable for a wireless communication system to process and transfer location information in a manner which further reduces the risk of privacy violations or identity disclosures. It is desirable for the wireless communication system to provide real time, or near real time, location information about the location of wireless communication devices while minimizing the possibility of disclosing the identities of the wireless communication devices or the users of those devices.

Figure 3:
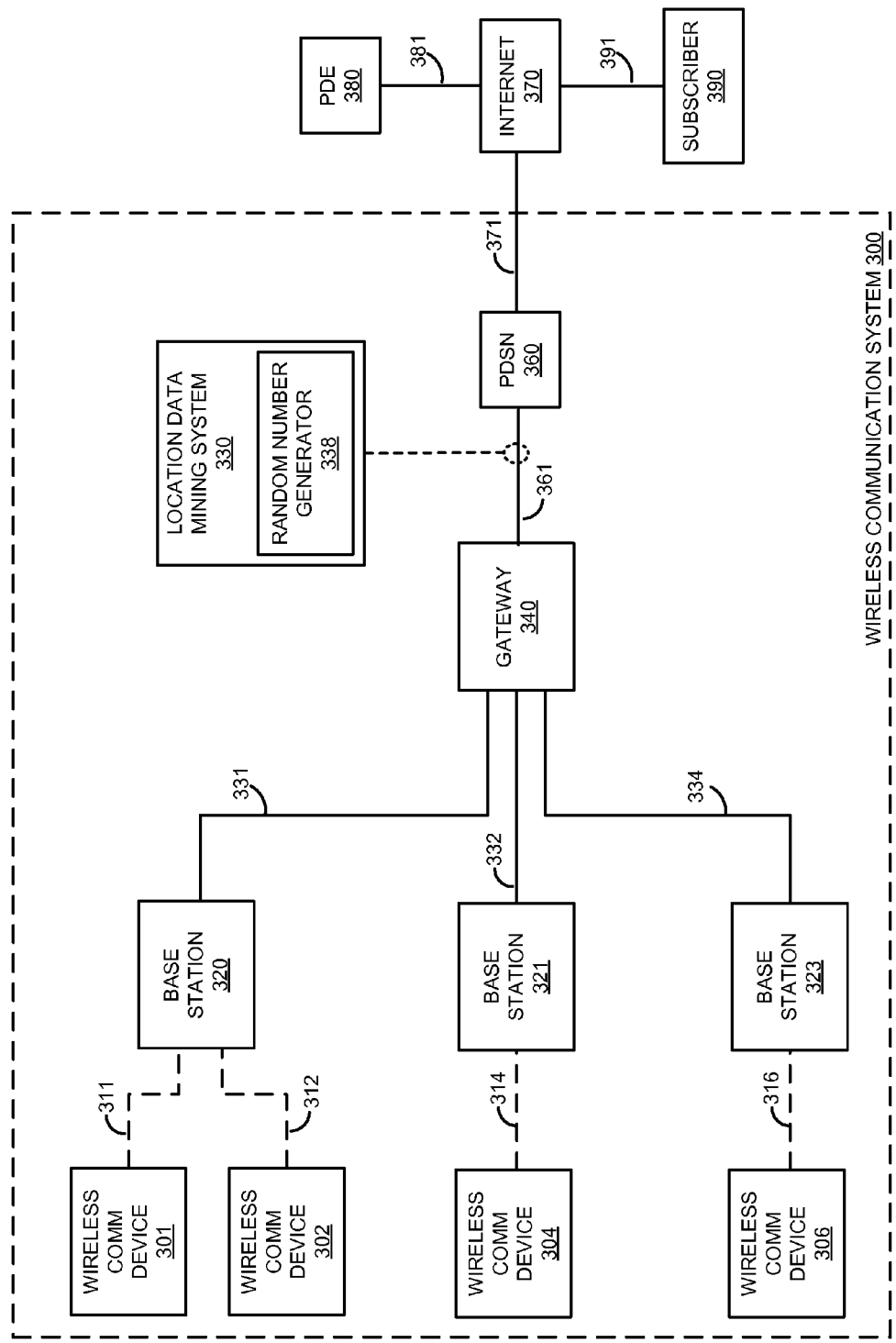
FIG. 3 illustrates a wireless communication system including a location data mining system.

FIG. 3 illustrates wireless communication system 300 which includes a location data mining system. Wireless communication system 300 is an example of wireless communication system 100, although wireless communication system 100 may use an alternate configuration or operate in an alternate manner. Wireless communication system 300 comprises wireless communication devices 301-306, base stations 320-323, gateway 340, location data mining system 330, and packet data serving node (PDSN) 360. Wireless communication system 300 communicates with position determining entity (PDE) 380 and subscriber 390 through Internet 370.

Gateway 340 and base stations 320-323 function together to provide wireless communication services to wireless communication devices 301-306. In combination, gateway 340 and base stations 320-323 perform functions similar to those of wireless communication network 120, although wireless communication network 120 may have additional components, use an alternate configuration, or operate in an alternate manner. Gateway 340 utilizes PDSN 360 to make packet data connections to Internet 370, other packet networks, or combinations thereof.

Location data mining system 330 comprises random number generator 330. Location data mining system 330 is an example of location data system 130 although location data system 130 may use an alternate configuration or operate in an alternate manner. PDE 380 is an example of location assistance system 140 although location assistance system 140 may use an alternate configuration or operate in an alternate manner.

Subscriber 390 is a recipient and user of location records. It should be understood that subscriber 390 may receive location records from location data mining system 330 in a number of different ways. In FIG. 3, subscriber 390 receives the records through PDSN 360 and Internet 370. However, location data mining system 330 and subscriber 390 may be in communication over other types of connections including a dedicated connection, a wireless network, or some other means, including combinations thereof. It should also be understood that the link between wireless communication system 300 and PDE 380 may vary in a similar manner. Wireless communication system 300 and PDE 380 may be in communication over other types of connections including a dedicated connection, a wireless network, or some other means, including combinations thereof.

In some location determination methods, PDE 380 assists wireless communication system 300 in determining the location of wireless communication devices. Wireless communication device 302, for example, may request location assistance from PDE 380 by sending a location request message through base station 320, gateway 340, PDSN 360, and Internet 370. PDE 380 performs one or more location determination processes and returns one or more messages to wireless communication device 302 through Internet 370, PDSN 360, gateway 340, and base station 320. The one or more messages include information pertaining to the location of wireless communication device 302.

Figure 4:
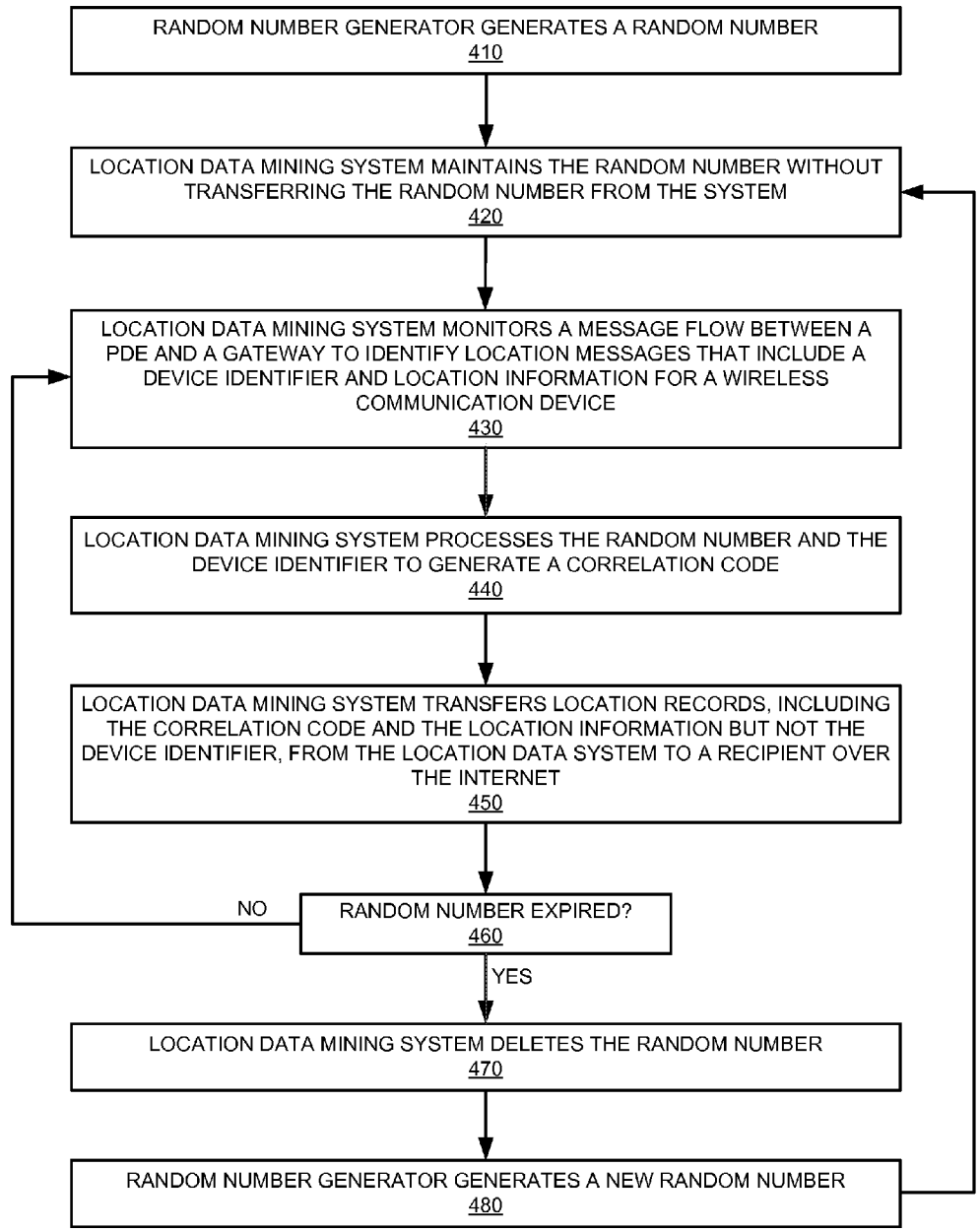
FIG. 4 illustrates an operation of a wireless communication system including a location data mining system.

In one example, FIG. 4 illustrates an operation of wireless communication system 300 utilizing location data mining system 330. This method provides uniquely identified location records while providing improved protection of the identities of wireless communication devices 301-306. The steps of the operation are indicated below parenthetically.

Random number generator 338 is located within location data mining system 330 and generates a random number (410). Location data mining system 330 maintains the random number without transferring it outside of wireless communication system 300 (420). Location data mining system 330 monitors the message flow between PDE 380 and gateway 340 on link 361 (430). The monitoring may be performed by detecting the traffic which flows on link 361 as illustrated in FIG. 3, by inserting location data mining system 330 directly in line between gateway 340 and PDSN 360, or in other ways. Location data mining system 330 monitors the message flow to identify location messages sent from PDE 380 to wireless communication system 300 which include a device identifier and location information for one of wireless communication devices 301-306 (430). These location messages are typically sent from PDE 380 in response to a request for location assistance from one of wireless communication devices 301-306 or gateway 340 and will typically be in the form of an IS801 message.

Because the location messages contain location information about a specific wireless communication device, the location messages typically include a device identifier. Although many types of device identifiers are possible, one example of a device identifier which will be used for the remainder of this example is an International Mobile Subscriber Identity (IMSI).

Once location data mining system 330 identifies a message that includes an IMSI and location information, location data mining system 330 processes the random number and the IMSI to generate a correlation code (440). The purpose of the correlation code is to allow the location information to be uniquely identified but to protect the device identification information from disclosure. The random number is used as a key, seed, or some other type of input to the process of generating the unique correlation code. Generation of the correlation code may be accomplished using a hashing algorithm, encryption calculation, encoding process, advanced encryption standard, or other mathematical transformation of which many types are widely known and used. Without access to the random number, these transformations generally cannot be mathematically reversed to obtain the IMSI from the correlation code. A different random number may be used to generate a correlation code for each unique IMSI or a single random number may be used as a seed for generating correlation codes for multiple IMSI for some period of time.

Various types of location data may be used to identify the location of wireless communication device 302 or assist in identifying the location of wireless communication device 302. The location information may comprise any of these types of location data or supplemental information relating to the location data. For example, the location information may comprise a latitude, a longitude, an altitude, a wireless base station identifier, a location confidence factor, other types of location data, including combinations thereof.

Continuing with FIG. 4, location data mining system 330 transfers a location record to subscriber 390 over internet 370 through PDSN 360 (450). The transferred location record includes the correlation code and the location information for the wireless communication device but not the IMSI. This process typically continues such that location data mining system 330 continues processing additional location records associated with wireless communication devices 301-306, as well as other wireless communication devices, and transferring those location records to subscriber 390.

In some cases, location data mining system 330 will process and transfer multiple location records associated with wireless communication device 302 over a period of time. In one variation of the present example, location data mining system 330 deletes the IMSI of wireless communication device 302 during the time periods between identifying and processing each of the multiple location messages associated with wireless communication device 302.

After receiving multiple location records, subscriber 390 can combine the received location records to illustrate the location of populations of wireless communication devices. Subscriber 390 can also develop information and statistics illustrating the changes in those populations over time. Since there is a one-to-one relationship between correlation codes and IMSIs, subscriber 390 can also track the movement of individual wireless communication devices and develop traffic flow patterns without knowing the specific identity of the wireless communication device.

In the process described thus far, subscriber 390 or anyone else outside of wireless communication system 300 would not be able to easily determine the IMSI of wireless communication device 302 because the random number used to create the correlation code is not available outside of wireless communication system 300. It may even be difficult to determine the IMSI associated with the correlation code from within wireless communication system 300 because the random number is generated and maintained within location data mining system 330.

While this approach provides some level of protection, it could be subverted in several ways. First, nearly all encryption or encoding methods can usually be hacked or reverse engineered. Second, weaknesses in human or electronic processes could result in the random number eventually being disclosed. Third, subscriber 390 or someone else in possession of location information spanning weeks or months may be able to infer the identity of a wireless communication device user through careful analysis of patterns as described previously.

Therefore, location data mining system 330 performs additional steps to improve the protection of the identities of wireless communication devices 301-306 which are associated with the location records transferred to subscriber 390. The random numbers which are used to generate the correlation codes are periodically changed. This makes it more difficult to reverse engineer the process and minimizes the amount of information exposure if the random numbers or other details of the process were somehow divulged.

In order to do this, location data mining system 330 periodically determines if the random number has expired (460). If it has not expired, the message flow monitoring process continues (430). If it has expired, location data mining system deletes the random number (470). A record of the deleted random number is not kept in location data mining system 330. Once the first random number is deleted, random number generator 338 generates a new random number (480) which location data mining system 330 maintains in the same manner as the first random number (420).

As discussed previously, the same random number may be used to seed the algorithm used to generate correlation codes for multiple IMSI or a different random number may be associated with each IMSI. In either case, more than one criterion may be used to determine when a random number is expired and should be deleted. In one example, a random number may expire after a fixed period of time. In another example, a random number may expire after a specified number of location records which made use of the random number have been transferred. In yet another example, expiration may be based on both time period and number of uses.

In a variation of the example above, location data mining system 330 continues to monitor the message flow on link 361 to identify additional location messages that include an IMSI and location information for one of wireless communication devices 301-306. When another message is identified, location data mining system 330 processes the second random number and the device identifier to generate a second correlation code. Location data mining system 330 then transfers additional individual location records to subscriber 390. The individual additional location records are transferred in response to identifying individual location messages. Like the initial location records, the additional individual location records include the second correlation code and the additional location information but not the device identifier. This process continues until location data mining system 330 determines the second random number has expired and deletes the second random number.

Using the approach described above, the identities associated with location information are further protected from disclosure. The periodic change of the random number makes the process much more difficult to reverse engineer. In addition, only a small amount of recent information would be potentially divulged if the process of generating the correlation code were compromised. This is true because the random number is deleted each time it is changed. Without access to the random number, even the operators of wireless communication system 300 would likely be unable to establish a relationship between the correlation codes and IMSI after the random number has been deleted.

Figure 5:
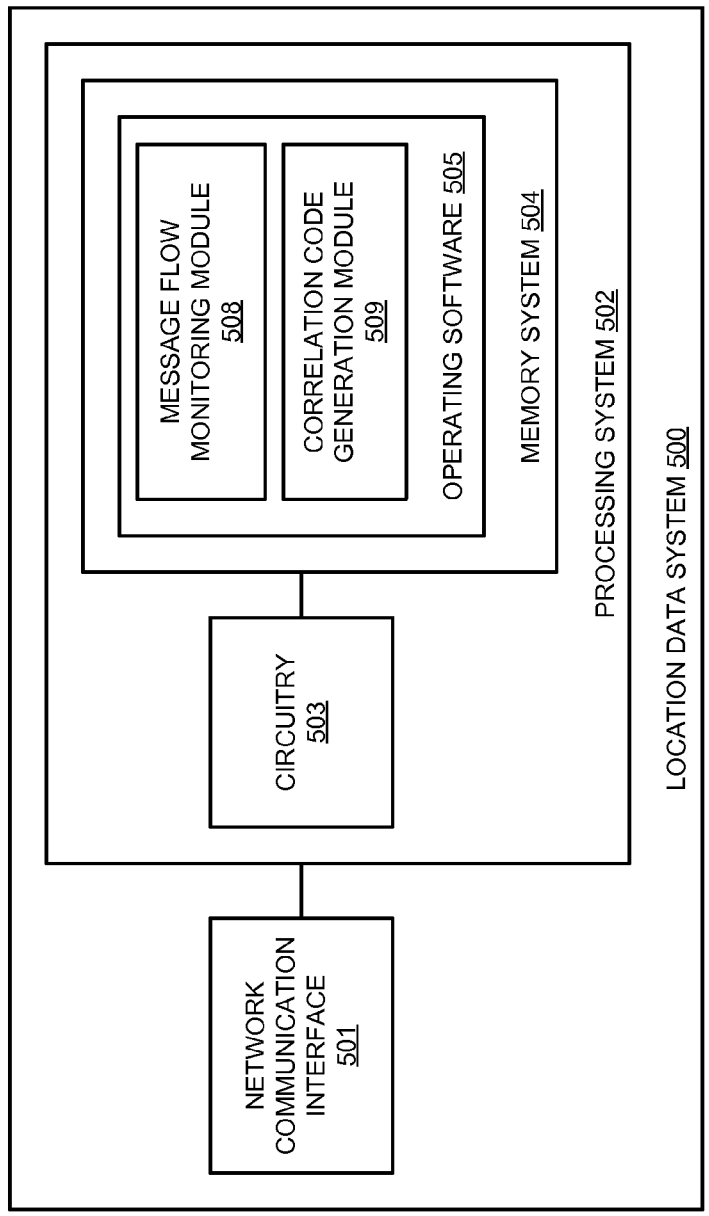
FIG. 5 illustrates a location data system.

FIG. 5 illustrates location data system 500. Location data system 500 is an example of location data mining system 330 and location data system 130 although location data mining system 330 and location data system 130 may use alternate configurations or operate in alternate manners. Location data system 500 comprises network communication interface 501 and processing system 502.

Network communication interface 501 comprises components that communicate over communication links, such as network cards, ports, RF transceivers, processing circuitry and software, or some other communication components. Network communication interface 501 may be configured to communicate over metallic, wireless, or optical links. Network communication interface 501 may be configured to use TDM, IP, Ethernet, optical networking, wireless protocols, communication signaling, or some other communication format, including combinations thereof. Network communication interface 501 is used to monitor message flow to identify location messages and to transfer location records to subscriber 390.

Processing system 502 comprises circuitry 503 and memory system 504. Circuitry 503 comprises microprocessor and other circuitry that retrieves and executes operating software 505. Memory system 504 comprises operating software 505. Memory system 504 may be a disk drive, flash drive, data storage circuitry, or some other non-transitory storage medium.

Software 505 comprises message flow monitoring module 508 and correlation code generation module 509. However, operating software 505 could have alternative configurations and may contain additional modules or functions in some examples. Operating software 505 may also comprise computer programs, firmware, or some other form of machine-readable processing instructions. Operating software 505 may include an operating system, utilities, drivers, network interfaces, applications, or some other type of software.

When executed by circuitry 503, operating software 505 directs processing system 502 to operate location data system 500 as described herein. In particular, operating software 505 directs message flow monitoring module 508 to monitor a message flow to identify location messages that include a device identifier and location information for wireless communication devices 301-306. In addition, operating software 505 directs correlation code generation module 509 to transfer a location record including the first correlation code and the location information, but not the device identifier from the location data system, wherein individual ones of the location records are transferred in response to identifying individual ones of the location messages.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a location data system for a wireless communication system, the method comprising:
   generating and maintaining a first random number without transferring the first random number from the location data system;
   monitoring a message flow to identify first location messages that include a device identifier and location information for a wireless communication device;
   for each individual one of the first location messages, performing a mathematical transformation on the device identifier, wherein input into the mathematical transformation includes the first random number, to generate a first correlation code;
   transferring first location records including the first correlation code and the location information but not the device identifier from the location data system, wherein individual ones of the location records are transferred in response to identifying individual ones of the first location messages;
   deleting the device identifier from the location data system for time periods between identifying consecutive ones of the first location messages; and
   deleting the first random number from the location data system.

2. The method of claim 1 further comprising:
   generating and maintaining a second random number without transferring the second random number from the location data system;
   monitoring the message flow to identify second location messages that include the device identifier and additional location information for the wireless communication device;
   performing the mathematical transformation on the device identifier, wherein the input into the mathematical transformation includes the second random number, to generate a second correlation code;
   transferring second location records including the second correlation code and the additional location information but not the device identifier from the location data system, wherein individual ones of the second location records are transferred in response to identifying individual ones of the second location messages; and
   deleting the second random number from the location data system.

3. The method of claim 2 wherein deleting the first random number and the second random number comprises deleting the first random number and the second random number at a periodic time interval.

4. The method of claim 1 wherein the device identifier comprises an International Mobile Subscriber Identity (IMSI).

5. The method of claim 1 wherein the location information comprises a latitude and a longitude.

6. The method of claim 1 wherein the location information comprises an altitude.

7. The method of claim 1 wherein the location information comprises a wireless base station identifier.

8. The method of claim 1 wherein the location information comprises a location confidence factor.

9. A wireless communication system comprising:
   a random number generator configured to generate a first random number; and
   a location data system configured to:
      maintain the first random number without transferring the first random number from the location data system;
      monitor a message flow to identify first location messages that include a device identifier and location information for a wireless communication device;
      for each individual one of the first location messages, perform a mathematical transformation on the device identifier, wherein input into the mathematical transformation includes the first random number, to generate a first correlation code;
      transfer first location records including the first correlation code and the location information but not the device identifier from the location data system, wherein individual ones of the location records are transferred in response to identifying individual ones of the first location messages;

delete the device identifier from the location data system for time periods between identifying consecutive ones of the first location messages; and delete the first random number from the location data system.

10. The wireless communication system of claim 9 wherein:

the random number generator is further configured to generate a second random number; and the location data system is further configured to:

maintain the second random number without transferring the second random number from the location data system;

monitor the message flow to identify second location messages that include the device identifier and additional location information for the wireless communication device;

perform the mathematical transformation on the device identifier, wherein the input into the mathematical transformation includes the second random number, to generate a second correlation code;

transfer second location records including the second correlation code and the additional location information but not the device identifier from the location data system, wherein individual ones of the second location records are transferred in response to identifying individual ones of the second location messages; and delete the second random number from the location data system.

11. The wireless communication system of claim 10 wherein the location data system is further configured to delete the first random number and delete the second random number at a periodic time interval.

12. The wireless communication system of claim 9 wherein the device identifier comprises an International Mobile Subscriber Identity (IMSI).

13. The wireless communication system of claim 9 wherein the location information comprises a latitude and a longitude.

14. The wireless communication system of claim 9 wherein the location information comprises an altitude.

15. The wireless communication system of claim 9 wherein the location information comprises a wireless base station identifier.

16. The wireless communication system of claim 9 wherein the location information comprises a location confidence factor.

* * * * *